United States Patent [19]
Ohmura et al.

[11] Patent Number: 4,655,571
[45] Date of Patent: Apr. 7, 1987

[54] TELEPHOTO LENS CAMERA

[75] Inventors: Hiroshi Ohmura; Tsutomu Tanaka; Kimiaki Nakada, all of Tokyo, Japan

[73] Assignee: Fuji Photo Film Co., Ltd., Kanagawa, Japan

[21] Appl. No.: 785,746

[22] Filed: Oct. 9, 1985

[30] Foreign Application Priority Data

| Oct. 17, 1984 | [JP] | Japan | 59-155682 |
| Oct. 17, 1984 | [JP] | Japan | 59-155683 |
| Dec. 12, 1984 | [JP] | Japan | 59-262223 |
| Dec. 12, 1984 | [JP] | Japan | 59-262224 |
| Dec. 12, 1984 | [JP] | Japan | 59-262225 |

[51] Int. Cl.⁴ .......................... G03B 15/05; G03B 3/00
[52] U.S. Cl. .................................. 354/150; 354/195.12
[58] Field of Search .................. 354/150, 151, 195.12, 354/106, 154, 155

[56] References Cited

U.S. PATENT DOCUMENTS

| 2,909,109 | 10/1959 | Back | 354/155 |
| 3,250,195 | 5/1966 | Maitani | 354/155 |
| 4,119,982 | 10/1978 | Imura et al. | 354/155 |
| 4,352,546 | 10/1982 | Iwata et al. | 354/195.12 X |
| 4,527,874 | 7/1985 | Ohmura | 354/195.12 |

Primary Examiner—Donald A. Griffin
Attorney, Agent, or Firm—Young & Thompson

[57] ABSTRACT

A telephoto lens having a long focal distance is disposed at an upper location at the side portion of a camera body, and the light passed therethrough is reflected sidewardly of the camera body by a pivotable first mirror. Disposed at an upper location of an exposure station is a second mirror which redirects the light from the first mirror to a third mirror disposed in front of and to the side of the second mirror. Below the third mirror and in a front part of an exposure station, a pivotable fourth mirror is disposed. Mounted at an upper location of the side portion of the camera body is an L-shaped movable lens barrel, in which an ultra telephoto lens having an exceptionally long focal length, and a fifth mirror for reflecting the light passed through the ultra telephoto lens toward the second mirror are disposed. The movable lens barrel is associated with the first mirror. When the movable lens barrel is adjacent the camera body, the camera is in telephotographing mode, and when the movable lens barrel is horizontally pulled up, the camera is in ultra telephotographing mode. In front of the fourth mirror, there is disposed a wide angle lens having a short focal distance. When the fourth mirror is displaced to be in a horizontal state, the camera is in a wide angle photographing mode.

20 Claims, 21 Drawing Figures

TELEPHOTO LENS CAMERA

BACKGROUND OF THE INVENTION

This invention relates to a telephoto lens camera, and more particularly to a camera of the type in which a long optical path length is obtained for the telephoto lens by utilizing a space at an upper part of a camera body.

At present, there is a tendency to make compact cameras even smaller and thinner than those which are currently available, which necessitates that a wide angle lens having a short focal distance be used. In such the wide angle lens, there is the shortcoming that a main object can only be photographed as a small part of the picture unless the camera is brought close enough thereto, since the angle of view is large. Because of the foregoing, when the situation prohibits the photographer from bringing the camera close enough to the object, for example, at an athletic event or a literary exhibition, it is impossible to take a satisfactory large size picture with a compact camera which has a wide angle lens with a 35 mm focal length. In order to overcome this problem, there is known a dual lens camera, as disclosed in Japanese Patent Early Disclosure No. 52(1977)-143013, which includes a telephoto lens having a long focal length and a wide angle lens having a short focal length, so that the user may select between a telephotograph and a wide angle photograph. This dual lens camera is constructed as such that a telephoto lens is displaced toward the side from a front part of an exposure station. The light from the image passes though the telephoto lens and is radiated onto a first mirror disposed behind the lens. The light is reflected toward the side of the camera body by the first mirror so that it reflects onto a second mirror disposed in a front part of the exposure station. The light is then reflected onto a film located in the exposure station. Also, a wide angle lens is disposed in a front part of the second mirror, so that when a wide angle photograph is taken, the second mirror is slid away from the front part of the film to guide the photographing light passing through the wide angle lens to the film. However, when a telephoto lens having a long focal length, for example, a telephoto lens of 135 mm, is used, since the back focus is comparatively long, it is necessary to have a long distance between the first and second mirrors in accordance with the long focal length thereof. As a result, it is necessary to make the lateral length of the camera body very long. If the mirrors are increased in number, for example, four mirrors for providing a crank-shaped photographing optical path on a same plane, it is possible to obtain a sufficiently long optical path length without having a long lateral length of the camera body. However, the thickness of the camera body becomes large. That is, a mere increase in the number of mirrors is not sufficient to effectively make the camera body small and thin.

Generally, when a telephoto lens having a focal length of 135 mm or so is used, a satisfactory telephotograph can be taken in many cases. However, in some cases such as in photographing wild birds, a long distance between the object and the camera is required. Moreover, if the object is inaccessible, it is necessary to use an ultra-telephoto lens having a focal length of, for example, 300 mm. (300 mm lens has approximately 8 times the telephoto effect as a lens having a focal length of 35 mm.) Moreover, when this ultra-telephoto lens is mounted on a camera body, the camera body must be large as in the case of the 135 mm telephoto lens. Furthermore, when a plurality of telephoto lens having different telephoto effects are used, such as a combination of a telephoto lens and an ultra telephoto lens, a selective use thereof can be conveniently made possible depending on the desired result.

OBJECT OF THE INVENTION

It is therefore a principle object of the present invention to provide a telephoto lens camera, wherein a sufficiently long optical path length can be obtained while still maintaining a camera body that is small and thin, thereby allowing the camera to have a built in telephoto lens with a long focal length.

Another object of the present invention is to provide a telephoto lens camera, wherein a plurality of lenses having different focal lengths are selectively used to allow the photographer the capability of taking more than just two kinds with photographs of different photo powers.

A further object of the invention is to provide a telephoto lens camera, wherein lenses can be switched with an easy manipulation.

A still further object of the invention is to provide a telephoto lens camera, wherein a lens having a considerably long focal length is collapsibly (pivot) disposed with respect to the camera body, so that the camera will not be too bulky for carrying and/or keeping.

SUMMARY OF THE INVENTION

In order to achieve the above and other objects and advantages, there is provided a telephoto lens camera, such that at least three mirrors are disposed on the inside of a camera body to obtain a three-dimensional optical path, so that the light from a telephoto lens disposed at the upper portion of the side of the camera body is reflected therefrom and guided to a film. According to the present invention, since the photographing optical path is three dimensionally folded by using a plurality of mirrors in the length width, and height directions of the camera body, a sufficient optical path length corresponding to a back focus of the camera body can be obtained without rendering the camera body bulky. In a preferred embodiment of the present invention, a mirror is disposed on a front surface of an exposure station, and three mirrors are disposed at an upper portion of a camera body. The lens having a comparatively long focal length, for example, a telephoto lens of 135 mm, is the one disposed at the upper portion of the body, at either the film take-up chamber side or the patrone accommodating chamber side. The light passing through the telephoto lens is reflected toward the side of the camera body by the first mirror disposed behind the telephoto lens and reflected onto the second mirror disposed at an upper location of the exposure station. This second mirror reflects the incident light forwardly with respect to the camera body onto the third mirror. This third mirror reflects the light downwardly onto the fourth mirror disposed in a front part of the exposure station. This fourth mirror reflects the light toward the exposure station. If the lens has an exceptionally long focal length, for example, if an ultra telephoto lens of 300 mm is used, a movable lens barrel should be disposed at an upper location of the side portion of the camera body, and within the movable lens barrel, there should be disposed the ultra telephoto lens and a fifth mirror for reflecting the light passing through the ultra telephoto lens to the side of the camera body. The movable lens barrel is capable of effecting the ultra telephotography when it is swung up perpendicular to the camera body. Since the movable lens barrel can be rotated in such a manner as to be in coordinating relation with the camera body upon completion of the photographing, it is not bulky and can be carried and kept with ease.

When the first mirror is a movable mirror, there can be provided both the telephoto lens and the ultra telephoto lens. Also, when the fourth mirror is a movable mirror and a wide angle lens of 35 mm or a standard lens of 50 mm, for example, is disposed in a front part of the camera, there can be effected both wide angle photography or standard photography as well as telephotography.

DETAILED DESCRIPTION OF THE INVENTION

Figures 1, 2, 3:
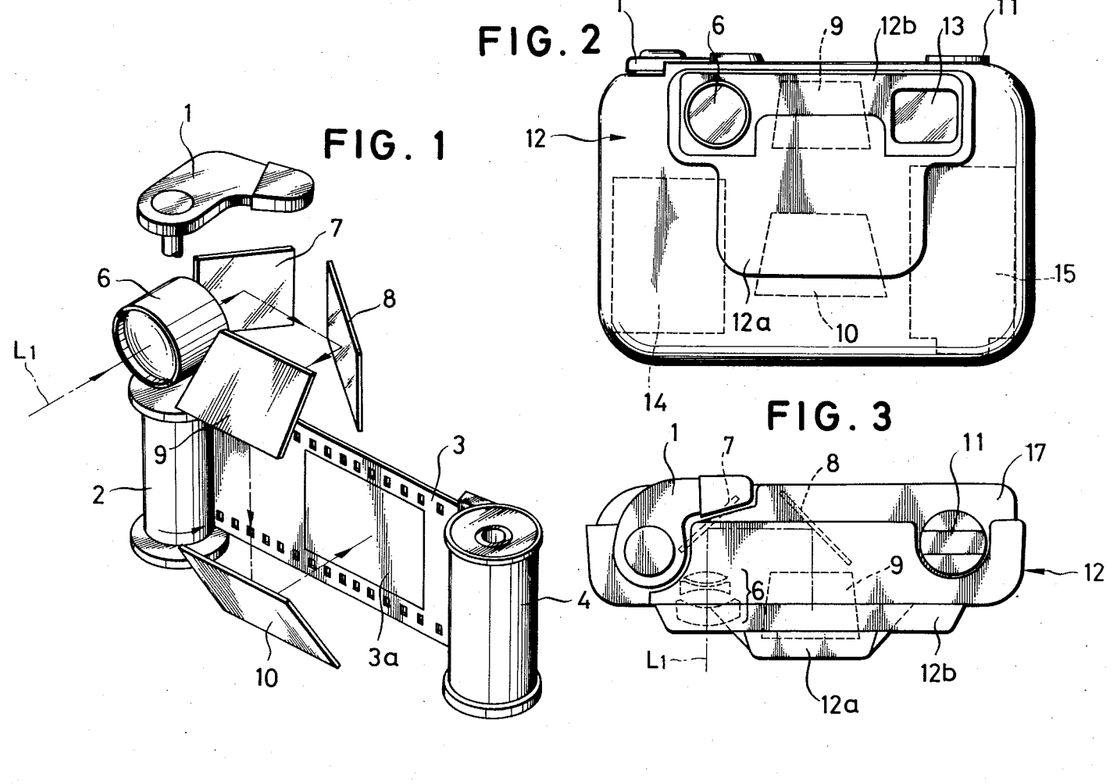
FIG. 1 is a schematic illustration showing an optical system including a telephoto lens according to a first embodiment of the present invention.
FIG. 2 is a front view of a camera incorporated with the optical system shown in FIG. 1.
FIG. 3 is a plan view of the camera shown in FIG. 2.

In FIG. 1 showing a schematic view of a first embodiment of the present invention, when a take-up lever 1 is manipulated, a take-up spool 2 is rotated in the direction of the arrow to permit the exposed part of film 3 to be rolled up around the outer periphery thereof. At the same time, the unexposed part of film 3 rolled up on the inside of a container or patrone 4 is drawn out by one frame. The take-up spool 2 is disposed on the inside of a film take-up chamber, and the patrone 4 is loaded into a patrone accommodating chamber. Between the film take-up chamber and the patrone accommodating chamber an exposure station is disposed with an aperture plate arranged as known per se, through which the photographing light reaches the film 3. The film 3 is 35 mm in width, in which an image plane 3a of 24×36 mm full size is recorded.

Disposed at an upper part of the film take-up chamber side is a telephoto lens 6 having a relatively long focal length (135 mm, for example), and the photographing light passing therethrough is radiated onto a first mirror 7 disposed behind lens 6. The first mirror 7 is inclined to the side at 45 degrees with respect to an optical axis L1 and adapted to reflect the incident photographing light toward the patrone-accommodating chamber side of the camera. Also disposed at an upper part of the exposure position is a second mirror 8 which is also inclined to the side at 45 degrees with respect to the optical axis but perpendicular to the first mirror. The second mirror 8 is adapted to reflect the incident photographing light forwardly. In front of the second mirror 8, a third mirror 9 is disposed with a vertical inclination of 45 degrees to reflect the incident photographing light downward. A fourth mirror 10 is disposed below the third mirror 9, in front of the exposure position and with a vertical inclination of 45 degrees. The mirror 10 is adapted to reflect the incident photographing light rearwardly toward the film located in the exposure station. Accordingly, the photographing light passing through the telephoto lens 6 further passes, while the shutter is still opened, to first mirror 7, second mirror 8, third mirror 9, and fourth mirror 10 in regular sequence, and is formed into an image on the film 3 in such a way as to be properly arranged at the upper, lower, right and left sides. In this way, by skillfuly taking advantage of the space in the length, width and height directions a long optical path length, corresponding to the back focus of the telephoto lens 6 may be obtained by using the first through fourth mirrors. All of the mirrors 7 through 10 are not necessarily inclined at 45 degrees with respect to the optical axis. Instead, the angles can be changed according to the desired location for each of the mirrors. Since films of high sensitivity have been recently put on sale, a telephoto lens having a small aperture ratio can render a proper exposure without causing the film to be under exposed.

Figures 4, 5, 6:
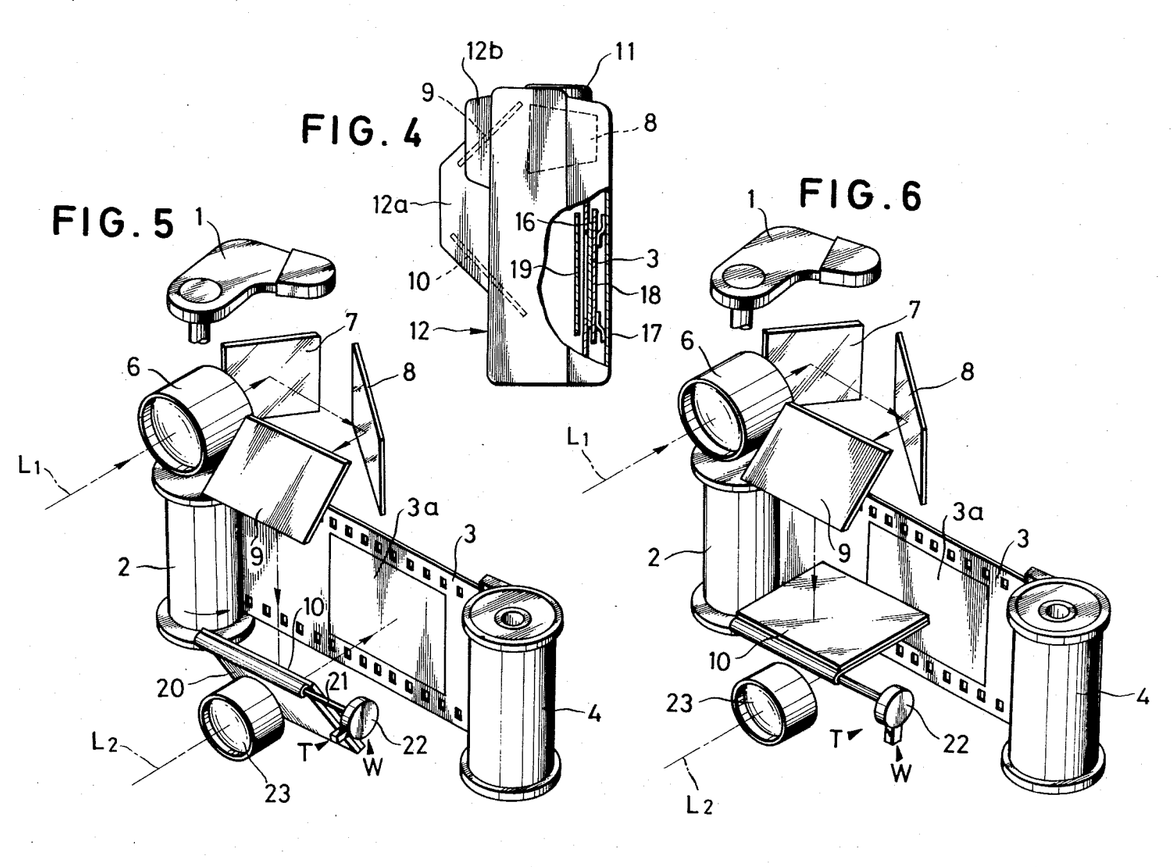
FIG. 4 is a side view of the camera shown in FIG. 2.
FIG. 5 is a schematic illustration of an optical system including a wide angle lens and a telephoto lens when set in a telephotography mode according to a second embodiment of the present invention.
FIG. 6 is a schematic illustration of an optical system when set in a wide angle photography mode according to the second embodiment.

FIGS. 2 though 4 illustrate a specific example of a camera provided with the optical system of FIG. 1, wherein like members shown in FIG. 1 are denoted by like reference numerals. A camera body 12 is slightly raised at its front surface. Disposed in this first raised portion 12a is the lower end portion of the third mirror 9 and the upper end portion of the fourth mirror 10. Provided at an upper location of the first raised portion 12a is a second raised portion 12b which is projected outward less than the first portion. Disposed at a proper space on the second raised portion 12b are the telephoto lens 6 and a finder 13. Disposed behind the telephoto lens 6 is the first mirror 7. Between the telephoto lens 6 and the finder 13, the second mirror 8 and the third mirror 9 are disposed. Below the telephoto lens 6, there is a film take-up chamber 14 accommodating the take-up spool 2. Below the finder 13, a patrone-accommodating chamber 15 adapted to accommodate the patrone 4 is formed. As shown in FIG. 4, an aperture plate 16 for forming an exposure station well known per se is disposed between the film take-up chamber 14 and the patrone-accommodating chamber 15. Behind the aperture plate 16, the film 3 is located. Forward tension on the film is provided by a pressure plate 18 held on a back cover 17. In front of the aperture plate 16, a shutter 19, known per se, is disposed, and in front of the shutter, the fourth mirror 10 is disposed. The shutter 19 may also be disposed within the telephoto lens 6 or immediately behind lens 6. Although there are also provided an aperture plate 16, a pressure plate 18, and a shutter 19 in the following embodiments, they have been omitted from the figures for clarity. Disposed on the upper surface of the camera body 12 are the take-up lever 1 and a rewinding crank 11, respectively. The positions of the telephoto lens 6 and the finder 13 are mutually shiftable.

FIGS. 5 and 6 illustrate a second embodiment, in which the camera used in the first embodiment as shown in FIG. 1 is further provided with a wide angle lens so that wide angle photography and telephotography can be selectively effected. In the figures, like members of FIG. 1 are denoted by like reference numerals. The fourth mirror 10 is mounted on a mirror holder 20 which is fixedly secured to a shaft 21. Mounted on the front end of the shaft 21 is a lens switching handle 22. When the lens switching handle 22 is set in a telephoto position [T], the fourth mirror 10 is brought to be in front of the film 3. Likewise, when it is set in a wide angle position [W], the fourth mirror 10 is rotated out of the way of the film 3. In front of the fourth mirror 10, a wide angle lens 23 having a short focal length (35 mm, for example) is disposed.

As shown in FIG. 5, when in the telephotography mode, the lens switching handle 22 is set in the telephoto position [T] and the fourth mirror 10 is inclined at an angle of 45° with respect to the film 3. Consequently, the photographing light passing through the telephoto lens 6 is formed on the film 3 in such a manner as to be properly arranged at the upper, lower, right, and left sides thereof, via the first mirror 7, second mirror 8, third mirror 9, and fourth mirror 10 in regular sequence.

As shown in FIG. 6, when in the wide angle photography mode, the lens switching handle 22 is set in the wide angle position [W]. The fourth mirror 10 is rotated to be in a generally horizontal position. In this position, the photographing light passing through the wide angle lens 23 forms an image on the film 3. If a focal plane shutter 19 as shown in FIG. 4 is used, at the time when the fourth mirror 10 is rotated to its generally horizontal position, it blocks an aperture (not shown) of a frame plate horizontally disposed at a lower location of the third mirror 9 for shutting off the light, thereby preventing the light from the telephoto lens 6 from reaching the film 3. If a lens shutter is provided on both the telephoto lens 6 and the wide angle lens 23, the above-mentioned blocking of the light is not necessary. Furthermore, instead of the wide angle lens 23, a standard lens having a 50 mm focal length may be employed.

Figure 7:
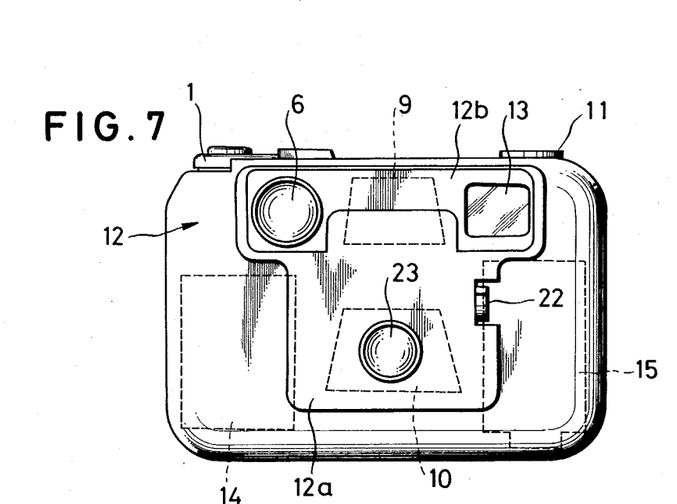
FIG. 7 is a front view of a camera incorporated with the optical systems shown in FIGS. 5 and 6.
Figure 8:
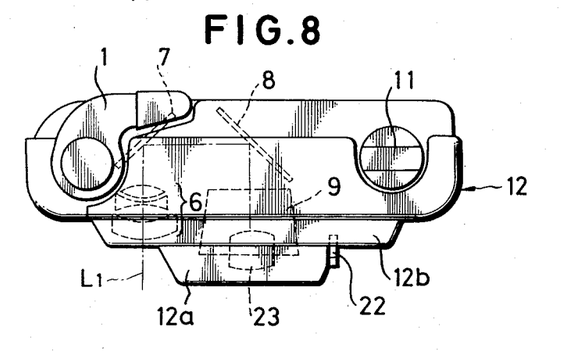
FIG. 8 is a plan view of the camera shown in FIG. 7.
Figure 9:
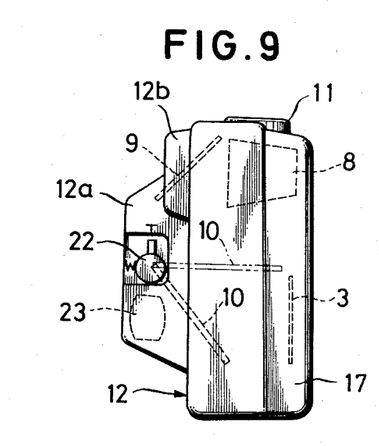
FIG. 9 is a side view of the camera shown in FIG. 7.

FIGS. 7 through 9 illustrate a specific example of the telephoto lens camera shown in FIGS. 5 and 6, in which like members of FIGS. 1 through 6 are denoted by like reference numerals. The wide angle lens 23 is accommodated in the camera body 12 in the first raised portion 12a. The lens switching handle 22 is rotatably disposed at the side of the first raised portion 12a. And, as shown in FIG. 9, the lens switching handle 22 is capable of swinging the fourth mirror 10 between a horizontal position and a position inclined at 45 degrees.

Figure 10:
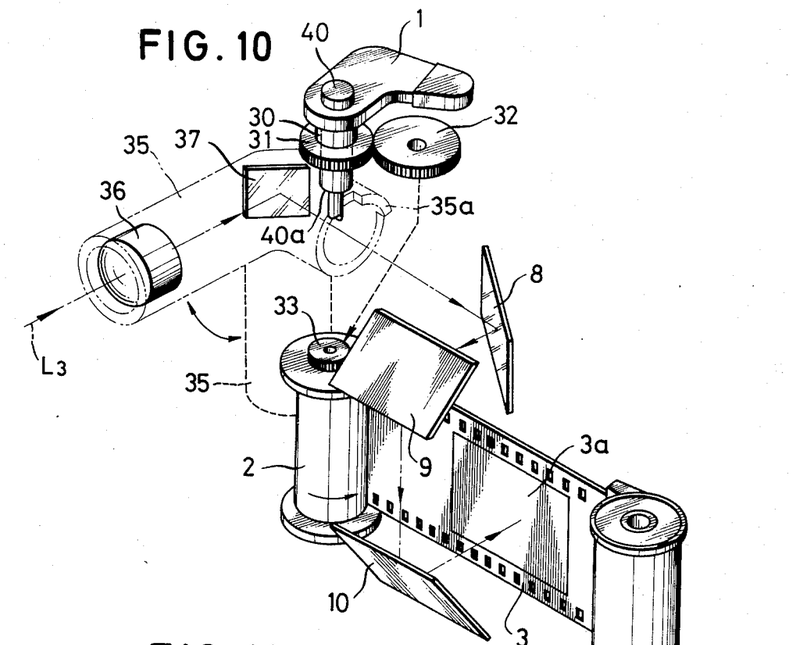
FIG. 10 is a schematic illustration of an optical system including an ultra telephoto lens according to a third embodiment of the present invention.

FIG. 10 illustrates an embodiment of an ultra telephoto lens having a focal length of 300 mm, for example, collapsibly mounted on the side portion of the camera body, in which like members of FIGS. 1 through 4 are denoted by like reference numerals. When the take-up lever 1 is manipulated, a shaft cover 30 fixedly secured thereto is rotated. A gear 31 is fixedly secured to the cover 30 in order to transmit the rotation of the take-up lever 1 to a gear 32. The rotation of the gear 32 is transmitted to the gear 33 fixedly secured to the take-up spool 2 through a gear train well known per se. As a result, the take-up spool 2 is rotated to take up the exposed film 3 around the outer periphery of the take-up spool 2. Near an upper part of the take-up spool 2 and the side portion of the camera body 12 (not shown), a movable lens barrel 35 is pivotally mounted. Disposed within the movable lens barrel 35 are an ultra telephoto lens 36 having a focal length of 300 mm, for example, and a fifth mirror 37 which is inclined at 45 degrees with respect to the optical axis L3 of the ultra telephoto lens 36 and is adapted to reflect the light passing therethrough toward the inside of the camera body 12. The movable lens barrel 35 is displaced between a retracted position as shown in a dotted line and a photographing position as shown by a two dotted chain line.

A release shaft 40, well known per se, is engaged with the shaft cover 30, which is fixedly secured to the take-up lever 1, so that the shaft is vertically movable. The release shaft 40 is locked when the movable lens barrel 35 is not set in the photographing position, therefore, the release shaft 40 is incapable of releasing a camera mechanism such as a shutter, etc. As a release lock mechanism for preventing the release, a projection 35a having a wide width is formed at an end portion of the movable lens barrel 35. When the movable lens barrel 35 is pulled up perpendicular to the camera body 12, the projection 35a is retreated from a lower part of a shoulder portion 40a of the release shaft 40.

When photographing, as shown in a two-dotted chain line, the movable lens barrel 35 is pulled up to project from the side portion of the camera body 12. When the movable lens-barrel 35 is pulled up, the projection 35a formed on the movable lens barrel 35 is retreated from the lower part of the shoulder portion 40a, to allow ultra telephotography. The light passed through the ultra telephoto lens 36 is reflected perpendicular to its incident direction by the fifth mirror 37 and directed into the camera body 12 where it travels generally in parallel with the film 3 and is radiated onto the second mirror 8. The second mirror 8 reflects the incident light forwardly with respect to the camera to transmit the light to the third mirror 9. The light is reflected downwardly by the third mirror 9 and is reflected backwardly by the fourth mirror 10 to reach the film located in the exposure position. The image of the object which is properly arranged in the upper, lower right and left sides by these four mirrors is recorded in the film 3 while the shutter is open.

After photographing, the movable lens barrel 35 is pivoted to a retreated position as shown by a dotted line. When the movable lens barrel 35 is pivoting, or brought to be in the retreated position, since the projection 35a formed on the movable lens barrel 35 engages the lower part of the shoulder portion 40a of the release shaft 40, the downward stroke of the release shaft 40 is prevented. As a result, a camera mechanism such as the shutter, becomes inoperable.

FIGS. 11 through 14 illustrate a specific example of a camera employing the optical system shown in FIG. 10. The camera body 12 is formed at the right side portion with an opening for introducing the light from the movable lens barrel 35 into the camera body 12. An end margin 42 of this opening engages in an annular-shaped groove 35b formed in the movable lens barrel 35.

The movable lens barrel 35 is correctly positioned by a lock mechanism in a coordinating relation with the body 12 at either the retreated position or and the photographing position when the barrel is pulled up. The lock mechanism cmprises two engaging holes 35c formed in an end portion of the outer periphery of the movable lens barrel 35 and spaced apart by 90 degrees. Engaged in the engaging holes 35c is a lock lever 43 which is slidably mounted on the camera body 12. The lock lever 43 is compressed into the engaging holes 35c by a spring 44. When the movable lens barrel 35 is brought to be in either the retreated position as shown FIG. 12 or in the photographing position as shown in FIG. 13, the lock lever 43 is engaged in one of the two engaging holes 35c.

Figure 11:
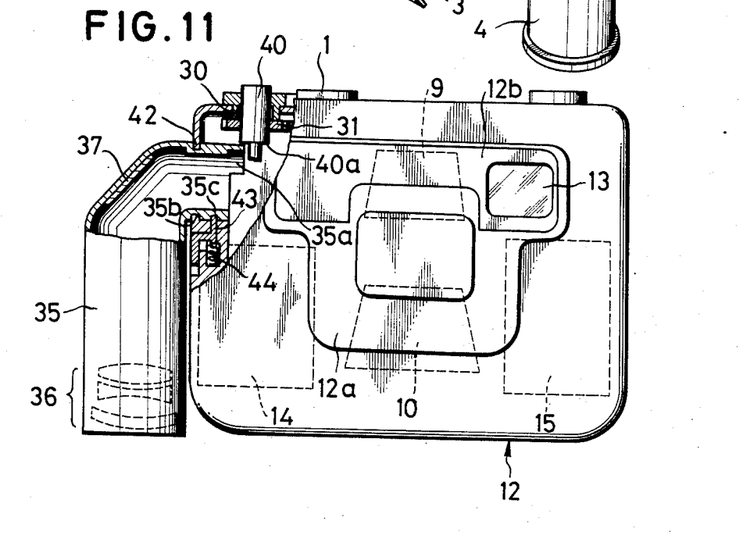
FIG. 11 is a front view of a camera incorporated with the optical system according to the third embodiment of FIG. 10.
Figure 12:
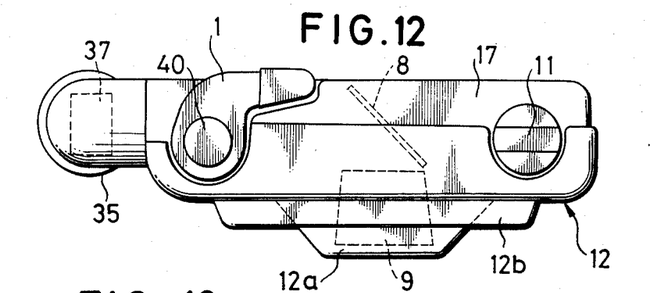
FIG. 12 is a plan view of the camera shown in FIG. 11.
Figure 13:
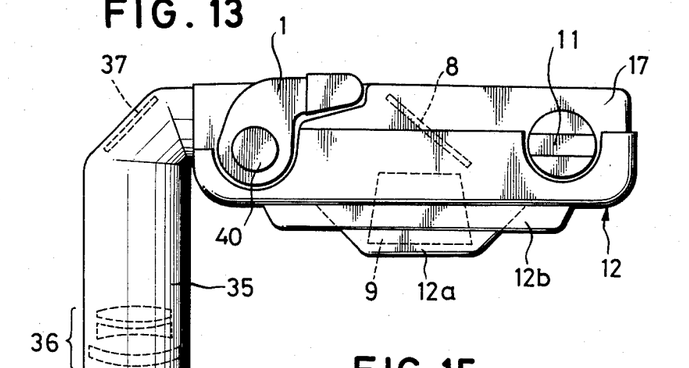
FIG. 13 is a plan view of a camera in a state in which a movable lens barrel in pulled up for setting in an ultra telephotography mode.

As shown in FIGS. 11 and 12, when the movable lens-barrel 35 is located in a position which is in coordinating relation with the camera body 12, the projection 35a formed on the movable lens barrel 35 prevents the downward stroke of the release shaft 40 so that no ultra telephotography is possible. In order to effect an ultra telephotograph, the lock lever 43 is slid downward against the force of the spring 44 so that its front end is disengaged from the engaging hole 35c, and thereafter, the movable lens barrel 35 is pivoted. Whereas shown in FIG. 13, the movable lens barrel 35 is rotated by 90 degrees, the other engaging hole 35c comes to be in accord with the front end of the lock lever 43. Accordingly, the lock lever 43 is engaged therein by the spring 44. The movable lens barrel 35 is thus correctly positioned in a photographing position perpendicularly erected from the camera body 12. At the same time, the projection 35a formed on the movable lens barrel 35 is retreated from the release shaft 40 to permit the release shaft 40 to be pushed down. When the movable lens barrel 35 is correctly positioned in the photographing position, the light passing through the ultra telephoto lens 36 can reach the film 3 via the fifth mirror 37, and the second mirror 8 through the fourth mirror 10 in regular sequence.

Figure 14:
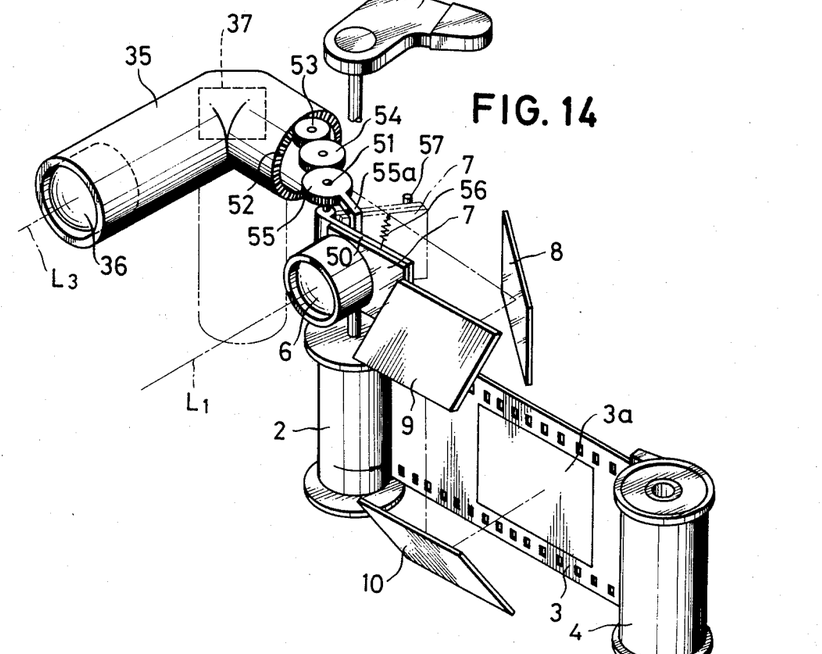
FIG. 14 is a schematic illustration of the optical system including the telephoto lens and the ultra telephoto lens according to a fourth embodiment of the present invention.

FIG. 14 illustrates an embodiment which is a combination of the embodiment shown in FIG. 1 and the embodiment shown in FIG. 10 for selectively effecting telephotography and ultra telephotography, in which like members of the preceding embodiments are denoted by like reference numerals. At the side portion of a camera body (not shown), the movable lens barrel 35, accommodating an ultra telephoto lens having, for example, a long focal length of 300 mm and the fifth mirror 37, is pivotably mounted. Disposed at the left and upper part of the camera body is the telephoto lens 6 having a focal length of, for example, 135 mm. Disposed behind the telephoto lens 6 is the first mirror 7. The first mirror 7 is held by a mirror holder 50, and pivoted about a rotatable shaft 51, fixedly secured to the mirror holder 50, to move between a position which is laterally inclined by 45 degrees with respect to the optical axis L1 and a position generally parallel to the optical axis L1.

The first mirror 7 is pivoted in association with the movement of the movable lens barrel 35 to select the optical path for either the ultra telephoto lens 36 or the telephoto lens 6. To this end, the movable lens barrel 35 is provided at its end portion with a crown gear 52, with which a pinion gear 53 is meshed. The rotation of the pinion gear 53 is transmitted to the gear 55 through an intermediate gear 54. The gear 55 is loosely fitted to the upper end of the rotatable shaft 51 of the mirror holder 50. A projecting lever portion 55a of the gear 55 pushes the mirror holder 50 against the force of a spring 56 to rotate it out of the reflective optical path of the fifth mirror 37. Also, when the gear 55 is rotated counterclockwise, since the lever portion 55a is not connected to the mirror holder 50, the mirror holder 50 is pivoted by the spring 56 to be in a position where the mirror holder 50 is received by a fixing ping 57. As a result, the first mirror 7 is correctly positioned in a position which is in the reflective optical path of the fifth mirror 37.

In order to effect ultra telephotography as shown in a solid line, the movable lens barrel 35 is pulled up to be essentially free from the side portion of the camera body 12. When the movable lens barrel 35 is pulled up, the rotation of the crown gear 52 is transmitted to the gear 55 through the pinion gear 53 and the intermediate gear 54. When the gear 55 is rotated, the first mirror 7 is pushed by lever portion 55a to move it from a retracted position abutting against the fixing pin 57 as shown by a two-dotted chain line to a position where it blocks the optical path of the telephoto lens 6, as shown by a solid line. Because of the foregoing, the light passed through the ultra telephoto lens 36 reaches the film 3 located in the exposure position via the fifth mirror 37, second mirror 8, third mirror 9, and fourth mirror 10 in regular sequence, and is exposed on the film 3 in a state wherein the object is properly arrranged on all sides.

When telephotography with a comparatively large telephoto effect is effected, as shown by a two dotted chain line, the movable lens barrel 35 is pivoted to a position which is adjacent the camera body 2. When the movable lens barrel 35 is pivoted, the first mirror 7 is moved by the spring 56 from the retracted position as shown by a solid line to a position as shown by a two-dotted chain line to block the optical path of the ultra telephoto lens 36. In this case, the photographing light passing through the telephoto lens 6 reaches the film 3 located in the exposure position via the first mirror 7, second mirror 8, third mirror 9 and fourth mirror 10 in regular sequence.

Figure 15:
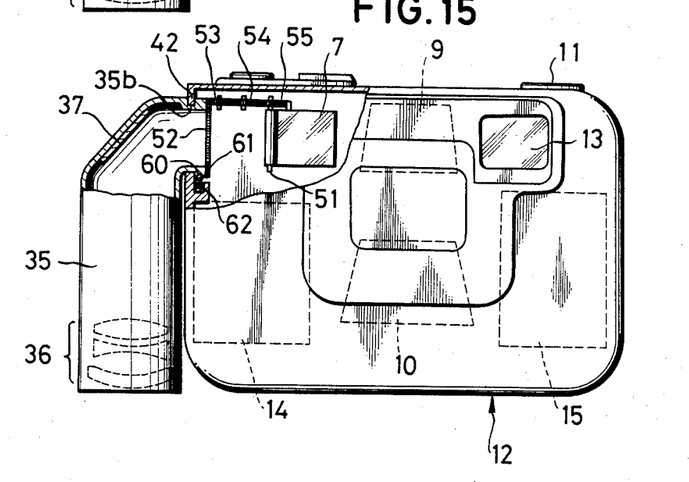
FIG. 15 is a front view of a camera incorporated with the optical system shown in FIG. 14.
Figure 16:
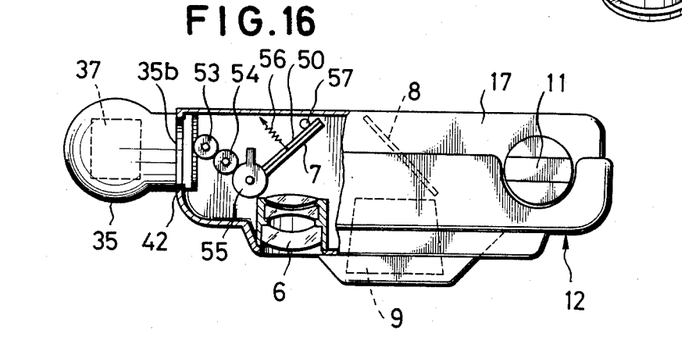
FIG. 16 is a plan view of the camera shown in FIG. 15.
Figures 17, 18, 21:
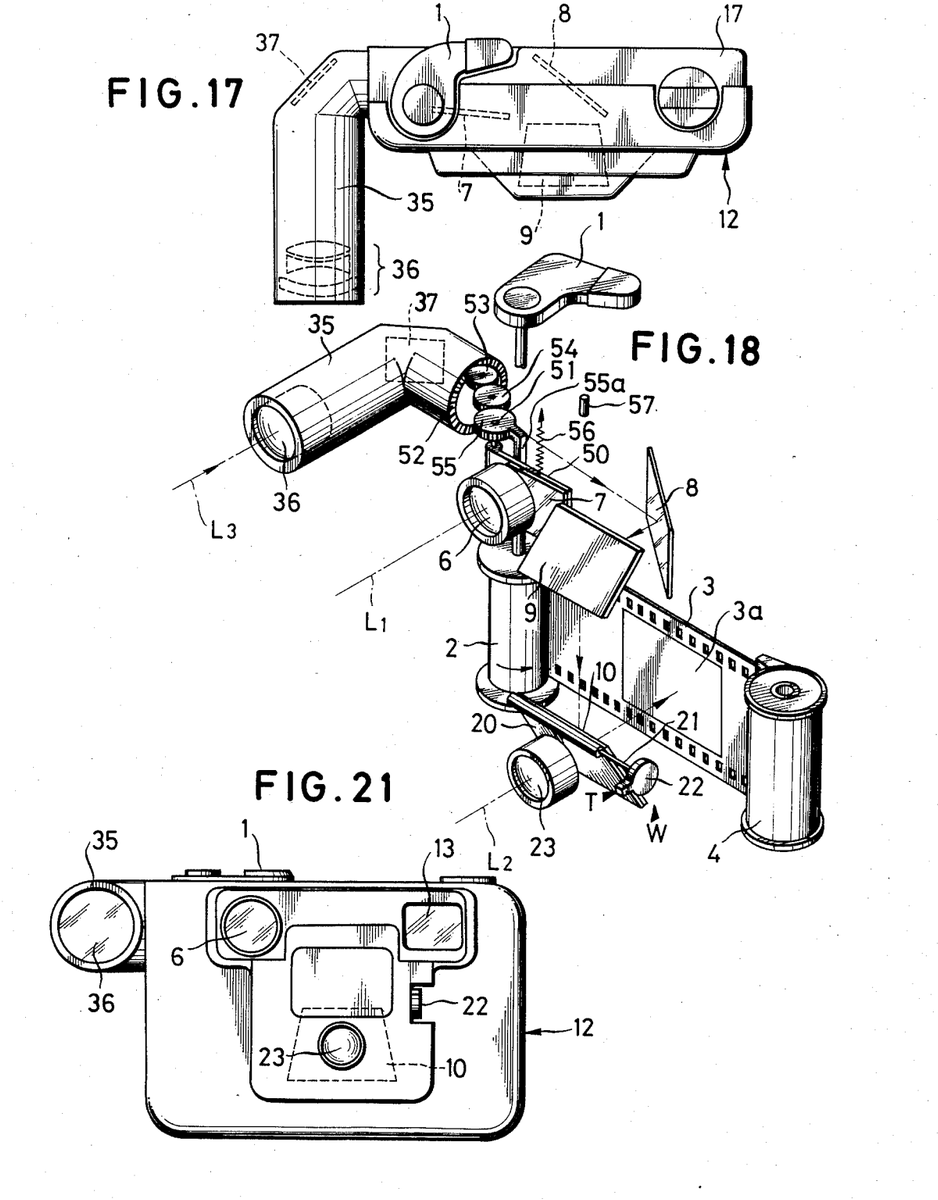
FIG. 17 is a plan view of the camera set in the ultra telephotographing mode shown in FIG. 15.
FIG. 18 is a schematic illustration of an optical system including a wide angle lens, a telephoto lens and an ultra telephoto lens when set in an ultra telephotography mode according to a fifth embodiment of the present invention.
FIG. 21 is a front view of a camera incorporated with the optical system shown in FIG. 18 or FIG. 19.

FIGS. 15 through 17 denotes a specific example of a camera employing the optical system shown in FIG. 14.

In order to correctly position the movable lens barrel 35 between its position where the movable lens barrel 35 is adjacent the camera body 12 and the position where lens barrel 35 is pulled up, two click grooves 60 are formed in the outer periphery of the end portion of the movable lens barrel 35 and are spaced apart by 90 degrees. Engage in the click grooves 60 is a click ball 61 provided on the camera body 12. The click ball 61 is energized by a spring 62 in a direction to place it within the click groove 60. Instead of this click mechanism, the slide-type lock mechanism shown in FIG. 11, for example, may be employed, so that the movable lens barrel 35 will be pivoted only when the lock mechanism is manipulated.

As shown in FIGS. 15 and 16, when the movable lens-barrel 35 is adjacent the camera body 12, the first mirror 7 shades the optical path of the ultra telephoto lens 36. Accordingly, only the light passing through the telephoto lens 6 reaches the exposure position. As shown in FIG. 17, when the movable lens barrel 35 is pulled up from the camera body 12, the first mirror 7 is located in the position abutting the telephoto lens. Accordingly, only the light passed through the ultra telephoto lens 36 reaches the exposure position.

FIGS. 18 through 21 illustrates an embodiment of a combination of the embodiment of FIGS. 5 through FIG. 9 and the embodiment of FIGS. 10 through 13, so that ultra telephotography, telephotography and wide range photography can be selectively effected.

As shown in FIG. 18, when ultra telephotography is effected, firstly, the lens switching handle 22 is set in the telephoto position [T], and thereafter, the movable lens barrel 35 is pulled up to protect from the side portion of the camera body 12. When the lens switching handle 22 is set in the telephoto position [T], the mirror holder 20 holding the fourth mirror 10 blocks the optical axis L2 of the wide angle lens 23. When the movable lens barrel 35 is pulled up, as described in the foregoing, the first mirror 7 is pivoted about a shaft 51 clockwise to move to a position for blocking the optical path L1 of the telephoto lens 6. Because of the foregoing, the light passing through the ultra telephoto lens 36 can reach the film 3 via the respective mirrors in regular sequence while the shutter (not shown) is still opened.

Figure 19:
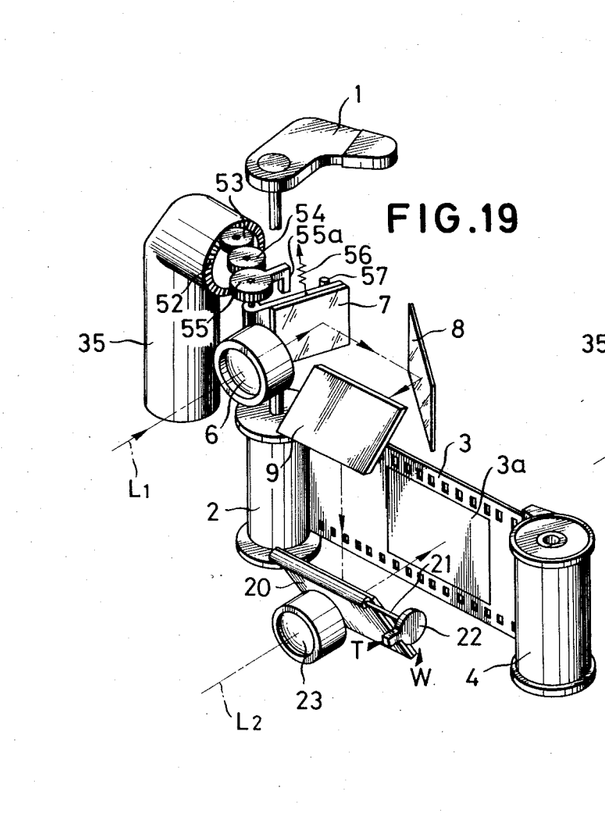
FIG. 19 is likewise a schematic illustration when set in a telephotography mode.

When a telephotography is effected, as shown in FIG. 19, the movable lens barrel 35 is pivoted to a position adjacent the camera body 12. At the time when the movable lens barrel 35 is pivoted, associated with the foregoing pivotal movement, the first mirror 7 is moved to a position abutting against the fixing pin 57, and the mirror holder 50 blocks the optical path L3 of the ultra telephoto lens 36. In this case, the photographing light passing through the telephoto lens 6 reaches the film 3 via the respective lenses 7 through 10 while the shutter is still opened.

Figure 20:
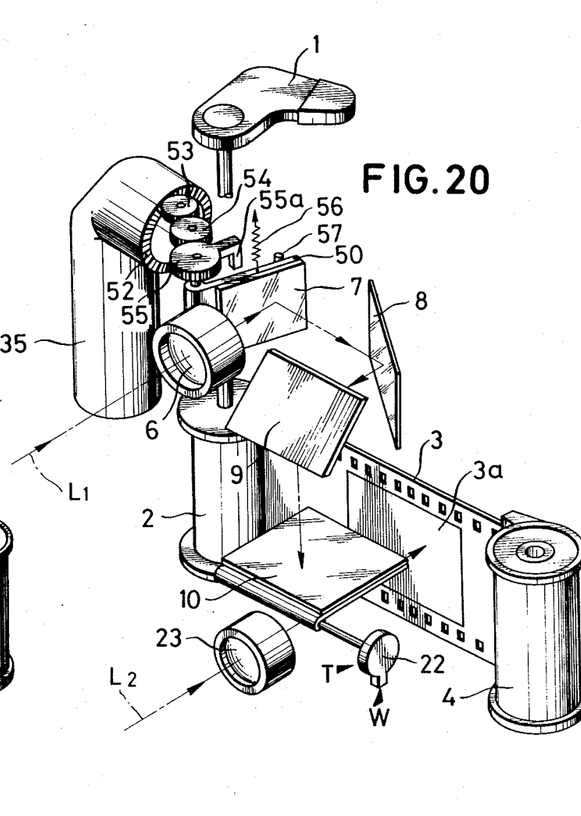
FIG. 20 is likewise a schematic illustration when set in a wide angle photography mode.

When wide angle photography is effected, as shown in FIG. 20, the lens switching handle 22 is set in the wide angle position [W]. In this case, the fourth mirror 10 moves to a horizontal position to block the optical path from the third mirror 9. As a result, the light passing through the wide angle lens 23 can directly reach the film 3.

The terms "wide angle lens", "standard lens", "telephoto lens", and "ultra telephoto lens" as used in this specification are used to distinguish between the differences of the focal lengths of the lenses. Accordingly, the kinds of lenses should not restrictively be defined in relation with any specific focal length value, except as examples of possible embodiments. Further, the mirrors according to the present invention should be interpreted as optical elements having a reflective surface. Accordingly, prisms are also included in a conception of mirrors. Furthermore, a plurality of mirrors can be replaced with a prism.

While particular embodiments of the present invention have been shown in the drawings and described above, it will be apparent that many changes and modifications may be made in the form, arrangement and positioning of the various component elements of the combination. In consideration thereof, it should be understood that preferred embodiments of the present invention disclosed herein are intended to be illustrative only and not intended to limit the scope of the invention.

What is claimed is:

1. In a camera having in a central region an exposure station, at one side a film take-up chamber, and at the other side a patrone-accommodating chamber; the improvement comprising: a first lens disposed in an upper portion of one side of said camera; a first mirror disposed behind said first lens, said mirror being disposed at an angle to said first lens so that light from said first lens reflects from said first mirror toward the center of said camera; a second mirror disposed to the rear of said first lens and to the side of said first mirror and at an angle to said first nirror to reflect said light from said first mirror toward the front of said camera; a third mirror disposed at the front center of said camera to reflect light from said second mirror toward the bottom of said camera; and a fourth mirror disposed below said third mirror and adapted to reflect light from said third mirror rearwardly toward said exposure station.

2. A camera according to claim 1, further comprising a second lens disposed in a front central region of said camera, such that said first lens has a relatively long focal length with respect to said second lens which has a relatively short focal length; wherein said fourth mirror is disposed behind said second lens and said fourth mirror is rotatable between a first position in which light reflected from said third mirror reflects from said fourth mirror to expose film and in which light from said second lens is prevented from reaching said film, and a second position in which light from said third mirror is reflected from said fourth mirror and prevented from reaching said film and in which light from said second lens is allowed to expose said film.

3. A camera according to claim 2, wherein, when said fourth mirror is in a position to prevent light from said third mirror from reaching said film, said fourth mirror is in a generally horizontal position, and when said fourth mirror is in a position to allow light from said third mirror to reflect from said fourth mirror to expose said film, said fourth mirror is disposed at an angle of 45° to the horizontal.

4. A camera according to claim 3, wherein said fourth mirror is rotatable about a shaft extending parallel to the front of said camera.

5. A camera according to claim 4, wherein said shaft is connected to a handle provided on an outer side of said camera.

6. A camera according to claim 3, wherein said first lens is a telephoto lens having a focal length of about 135 mm, and said second lens is a wide angle lens having a focal length of about 35 mm.

7. In a camera having in a central region an exposure station, at one side a film take-up chamber, and at the other side a patrone-accommodating chamber; the improvement comprising: an opening formed at an upper side of said camera; a movable lens barrel pivotally mounted in said opening, said barrel being adapted to pivot between a position adjacent to said camera and a position wherein said barrel extends perpendicularly from said camera, said barrel comprising a first lens having a long focal length and a first mirror disposed behind said first lens for reflecting light passing through said first lens toward the interior of said camera body; and mirror means within the camera body for reflecting light from said first mirror toward a back central region of said camera so that said light exposes film in said camera.

8. A camera according to claim 7, in which said mirror means comprises: a second mirror disposed at an upper back portion of said camera for reflecting light from said first mirror toward the front of said camera; a third mirror at an upper front portion of said camera, said third mirror reflecting light from said second mirror toward the bottom of said camera; and a fourth mirror at a front lower portion of said camera, said fourth mirror reflecting light from said third mirror toward a back central region of said camera so that said light exposes film in said camera.

9. A camera according to claim 8, which further comprises: a release lock mechanism for preventing a shutter release when said movable lens barrel is not set in the position perpendicular to said camera, said position being the photographing position.

10. A camera according to claim 9, which further includes a lock mechanism for automatically locking said movable lens barrel when it is pivoted to either the adjacent position or the photographing position, said lock being able to be unlocked by means of outside manipulation.

11. A camera according to claim 8, wherein said camera further comprises: a second lens disposed at the same upper side of said camera as said opening, said second lens having a focal length shorter than said first lens; and a fifth mirror pivotally disposed behind said second lens, said fifth mirror being pivotable from a first position wherein it allows light from said lens barrel to reflect from said second mirror and blocks light from said second lens from reaching said second mirror, and a second position wherein said fifth mirror reflects light from said second lens toward said second mirror and blocks light from said lens barrel.

12. A camera according to claim 11, further comprising: an associated mechanism for pivoting said fifth mirror to said second position where it blocks light from said lens barrel when said lens barrel is in a position adjacent said camera body, and for pivoting said fifth mirror to said first position where it blocks light from said second lens and allows light from said lens barrel to reach said second mirror when said lens barrel is in a position perpendicular to said camera body.

13. A camera according to claim 12, wherein said fifth mirror is fixedly secured to a mirror holder having a rotatable shaft.

14. A camera according to claim 13, wherein said associated mechanism comprises: a crown gear provided at a part of said movable lens barrel inserted into said camera; a gear loosely fitted to the rotatable shaft of said mirror holder and adapted to rotate in association with said crown gear, a projection provided to said gear and adapted to push said mirror holder to a position wherein it blocks light from said second lens when said lens barrel is perpendicular to said body, and a spring adapted to urge said mirror holder to move said mirror to a position where it blocks light from said lens barrel when said barrel is adjacent said body.

15. A camera according to claim 12, wherein said first lens is an ultra telephoto lens having a focal length of 350 mm and said second lens is a telephoto lens having a focal length of 135 mm.

16. A camera according to claim 11, wherein said first lens is an ultra telephoto lens having a focal length of about 350 mm and said second lens is a telephoto lens having a focal length of about 135 mm.

17. A camera according to claim 11, which further comprises: a third lens having a focal distance shorter than either said first lens or said second lens, said third lens being disposed at a front location of said camera and in front of said fourth mirror, and wherein said fourth mirror is rotatable between a position wherein it prevents light from said third mirror from reaching the film and allows light from said third lens to reach said film, and a position wherein said fourth mirror reflects light from said third mirror onto said film and prevents light from said third lens from reaching said film.

18. A camera according to claim 17, wherein said fourth mirror is rotatable about a shaft extending parallel to the front of said camera.

19. A camera according to claim 18, wherein said shaft is connected to a handle provided at an outer side of said camera body.

20. An improvement as in claim 17, wherein said first lens is an ultra telephoto lens having a focal length of 350 mm, said second lens is a telephoto lens having a focal length of 135 mm and said third lens is a wide angle lens having a focal length of 35 mm.

* * * * *